(12) United States Patent
Cho et al.

(10) Patent No.: US 10,005,890 B2
(45) Date of Patent: Jun. 26, 2018

(54) POLYESTER FILM AND ENVELOPE

(71) Applicants: SKC INC., Covington, GA (US); SKC CO., LTD, Suwon-si, Gyeonggi-do (KR)

(72) Inventors: Myeong Rae Cho, Suwon-si (KR); Eugene Jung, Lawrenceville, GA (US); Taehoung Jeong, Snellville, GA (US)

(73) Assignees: SKC INC., Covington, GA (US); SKC CO., LTD., Suwon-si (KR)

( * ) Notice: Subject to any disclaimer, the term of this patent is extended or adjusted under 35 U.S.C. 154(b) by 45 days.

(21) Appl. No.: 14/883,036

(22) Filed: Oct. 14, 2015

(65) Prior Publication Data

US 2016/0159994 A1 Jun. 9, 2016

Related U.S. Application Data

(60) Provisional application No. 62/064,201, filed on Oct. 15, 2014.

(51) Int. Cl.
*B29D 7/00* (2006.01)
*B29C 41/24* (2006.01)
*C08J 5/18* (2006.01)
*B65D 27/04* (2006.01)

(52) U.S. Cl.
CPC .............. *C08J 5/18* (2013.01); *B65D 27/04* (2013.01); *C08J 2367/02* (2013.01)

(58) Field of Classification Search
CPC ...... C08L 67/02; C08G 63/183; Y10T 428/24; Y10T 428/31786; B65D 65/38; B65D 23/0878
USPC .............. 206/497; 428/34.9, 35.7, 36.1, 34.1
See application file for complete search history.

(56) References Cited

U.S. PATENT DOCUMENTS

2005/0008815 A1* 1/2005 Sukigara .................... C08J 5/18
428/98
2013/0344345 A1* 12/2013 Sakellarides ....... B29C 47/0057
428/458

* cited by examiner

*Primary Examiner* — Ellen S Wood
(74) *Attorney, Agent, or Firm* — Sughrue Mion, PLLC

(57) ABSTRACT

The embodiments relate to a polyester film, which has a high tensile strength in the transverse direction and a low tensile strength in the longitudinal direction, while satisfying the condition of 0.5<A<6, A being calculated by Equation 1. A polyester film according to the embodiments can easily be cut in the transverse direction.

7 Claims, 1 Drawing Sheet

POLYESTER FILM AND ENVELOPE

TECHNICAL FIELD

The embodiments relate to a polyester film and a mail envelope.

BACKGROUND ART

Paper mail envelopes with a window have been widely used. For instance, Korean Laid-open Patent Publication No. 2002-0021568 discloses a mail envelope with a window covered by a transparent plastic film, through which the recipient's address inside the envelop can be seen.

DISCLOSURE OF INVENTION

Technical Problem

An objective of the embodiments is to provide a transparent polyester film, which has improved strength and can be easily cut, and a mail envelope having a window covered by such a film.

Solution to Problem

A polyester film according to the embodiments has a thickness of 5-50 μm, a tensile strength of 5-20 kpsi in the longitudinal direction (or machine direction; hereafter referred to as "MD"), a tensile strength of 15-40 kpsi in the transverse direction (hereafter referred to as "TD") substantially perpendicular to the MD, and a light transmittance of 80% or more. The polyester film has been stretched about 1.8-3.5 times in the MD and about 2-6 times in the TD. In the polyester film, A calculated by Equation 1 below is greater than 0.5 and less than 6:

$$\frac{|TS1 - TS2|}{TS1} = A \qquad \text{Equation 1}$$

wherein, TS1 and TS2 are tensile strengths in the MD and in the TD, respectively.

A mail envelope according to the embodiments comprises a paper envelope with a window covered by the above polyester film.

Advantageous Effects of Invention

A polyester film according to the embodiments has a high tensile strength in the TD and a low tensile strength in the MD, while satisfying the condition of 0.5<A<6, A being calculated by Equation 1 above. The polyester film according to the embodiments can easily be cut in the TD.

BEST MODE FOR CARRYING OUT THE INVENTION

Figure 1:
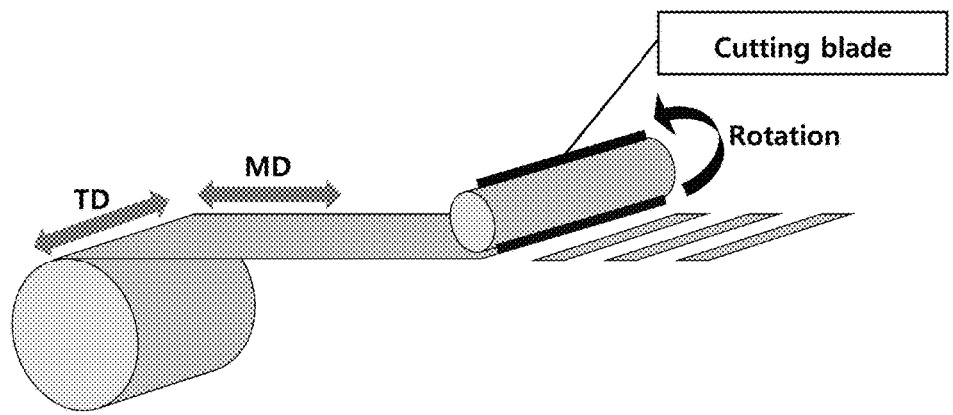
FIG. 1 is an illustrative view of a process of cutting a polyester film according to one embodiment.

A polyester film according to one embodiment comprises a polyester resin.

Specifically, the polyester film comprises a polyester resin as a main component. Preferably, the polyester film may comprise 80 wt % or more of a polyester resin. More preferably, the polyester film may comprise 90 wt % or more of a polyester resin. Even more preferably, the polyester film may comprise 99 wt % or more of a polyester resin.

The polyester resin comprises a diol component and a dicarboxylic acid component. Specifically, the polyester resin may primarily consist of a diol component and a dicarboxylic acid component. Preferably, the polyester resin may comprise about 95 mol % or more of a diol component and of a dicarboxylic acid component.

The polyester resin may be polymerized through transesterification of the diol and dicarboxylic acid components.

For example, the diol component may include ethylene glycol, 1,4-cyclohexanedimethanol, 1,3-propanediol, 1,2-octanediol, 1,3-octanediol, 2,3-butanediol, 1,3-butanediol, 1,4-butanediol, 1,5-pentanediol, 2,2-dimethyl-1,3-propanediol (or neopentyl glycol), 2-butyl-2-ethyl-1,3-propanediol, 2,2-ethyl-1,5-pentanediol, 2,4-diethyl-1,5-pentanediol, 3-methyl-1,5-pentanediol, 1,1-dimethyl-1,5-pentanediol, and a mixture thereof.

Preferably, the diol component may comprise 80 mol % or more of ethylene glycol. More preferably, the diol component may comprise 90 mol % or more of ethylene glycol. Even more preferably, the diol component may comprise 95 mol % or more of ethylene glycol. Still more preferably, the diol component may comprise 99 mol % or more of ethylene glycol.

The dicarboxylic acid component, for example, may include an aromatic dicarboxylic acid, such as terephthalic acid, dimethyl terephthalic acid, isophthalic acid, naphthalenedicarboxylic acid, and orthophthalic acid; an aliphatic dicarboxylic acid, such as adipic acid, azelaic acid, sebacic acid, and decane dicarboxylic acid; an alicyclic dicarboxylic acid; and esterified products thereof either alone or in combination of two or more thereof.

Specifically, the dicarboxylic acid component may comprise about 80 mol % or more of an aromatic dicarboxylic acid. Preferably, the dicarboxylic acid component may comprise about 80 mol % or more of terephtalic acid. More preferably, the dicarboxylic acid component may comprise about 90 mol % or more of terephtalic acid. Even more preferably, the dicarboxylic acid component may comprise about 95 mol % or more of terephtalic acid. Still more preferably, the dicarboxylic acid component may comprise about 99 mol % or more of terephtalic acid.

The polyester film may comprise polyethylene terephthalate. Preferably, the polyester film may comprise 90 wt % or more of polyethylene terephthalate. More preferably, the polyester film may comprise 95 wt % or more of polyethylene terephthalate. Even more preferably, the polyester film may consist of polyethylene terephthalate.

Here, the intrinsic viscosity (IV) of polyethylene terephthalate constituting the polyester resin may be about 0.4-0.8.

The polyester film may have a thickness of about 5-50 μm. Preferably, the polyester film may have a thickness of about 10-40 μm. More preferably, the polyester film may have a thickness of about 15-35 μm.

The polyester film may have been stretched about 1.8-3.5 times in the MD. Preferably, the polyester film may have been stretched about 2-3.5 times in the MD.

Also, the polyester film may have been stretched about 2-6 times in the TD. Preferably, the polyester film may have been stretched about 2.5-4.5 times in the TD.

More preferably, the polyester film may have been stretched about 2.5-3 times in the MD and about 4.0-4.5 times in the TD.

The polyester film may have a tensile strength of about 5-20 kpsi in the MD. Preferably, the polyester film may have a tensile strength of about 8-20 kpsi in the MD. More preferably, the polyester film may have a tensile strength of about 8-18 kpsi in the MD.

The polyester film may have a tensile strength of 15-40 kpsi in the TD.

In the polyester film, A calculated by Equation 1 below may be greater than 0.5 and less than 6:

$$\frac{|TS1 - TS2|}{TS1} = A \qquad \text{Equation 1}$$

wherein, TS1 and TS2 are tensile strengths in the MD and in the TD, respectively.

Preferably, A calculated by Equation 1 may be greater than 0.6 and less than 3. More preferably, A may be greater than 0.7 and less than 3. Even more preferably, A may be greater than 0.7 and less than 2.

As described above, if the tensile strengths in the MD and in the TD and the stretch ratios in the MD and in the TD satisfy the above ranges for A, a polyester film according to the embodiments can easily be cut, while having strength sufficient to be used for a window of a mail envelope.

Also, the polyester film has a tear strength of 5-85 kgf/μm in the MD. The polyester film has a tear strength of 0-15 kgf/μm in the TD.

The polyester film may have a light transmittance of 80% or more.

Also, the polyester film may have a haze of 2.0-30.

Especially, while a polyester film according to the present embodiment is stretched in the MD, it can easily be cut by blades pressurized in a direction perpendicular to the plane of the polyester film. The polyester film thus cut has appropriate tensile strength and tear strength.

As shown in FIG. 1, a cutting device cuts a polyester film in the TD by rotating blades attached onto a cylindrical shaft to pressurize in a direction perpendicular to the direction in which the film moves forward. If the strength of the film is more than the pressurizing force of the blades, the film may not be readily cut.

In order to improve the cutting performance, therefore, the present embodiment reduces the stretch ratio in the MD, thereby having the polyester chains arranged in the TD of the film and lowering the tensile strength in the MD, or increases the heat setting temperature, thereby reducing the crystallinity of the polyester chains and lowering the tensile strength in the MD.

Here, if the stretch ratio in the MD is significantly low, it may be advantages to reducing the tensile strength through the arrangement of the polyester chains, but may cause problems in the manufacturing process such as non-uniform thickness, hazed film, and breakage.

A polyester film according to the embodiments can be manufactured by the following process.

First, a polyester resin is prepared. As described above, the polyester resin may be prepared by transesterification and polymerization of diol and dicarboxylic acid components.

Then, the polyester resin is melted, extruded, and cooled to produce an unstretched sheet.

It is preferable to perform the melt extrusion at a temperature of from Tm+30 to Tm+60° C. If the melt extrusion temperature is lower than Tm+30° C., the resin may not be sufficiently melted, thereby increasing the viscosity of the extrudate and hampering the productivity. On the other hand, if the melt extrusion temperature is higher than Tm+60° C., the polyester may undergo thermal decomposition, thereby reducing the molecular weight of the resin and causing problems due to the production of oligomers. Also, it is preferable to perform the cooling at a temperature of 30° C. or less, and more preferable at a temperature of 15-30° C.

Subsequently, the unstretched sheet is stretched in the MD and in the TD, and is subjected to heat setting to produce a polyester film. The unstretched sheet can be stretched uniaxially or biaxially.

As described above, the unstretched sheet may be stretched at a higher stretch ratio in the TD than in the MD. For example, the unstretched sheet may be stretched about 2-6 times in the TD and about 1.8-3.5 times in the MD. Preferably, the unstretched sheet may be stretched about 2.5-4.5 times in the TD and about 2-3.5 times in the MD.

The stretch temperature is preferably from Tg+5 to Tg+50° C. Especially, in order to address brittleness, the stretch temperature is preferably from Tg+10 to Tg+40° C.

As heat setting begins, the film is relaxed in the MD and/or in the TD. The temperature for heat setting is preferably 60-100° C.

With reference to FIG. 1, a polyester film according to the embodiments is cut into a plurality of pieces by cutting blades.

Figure 2:
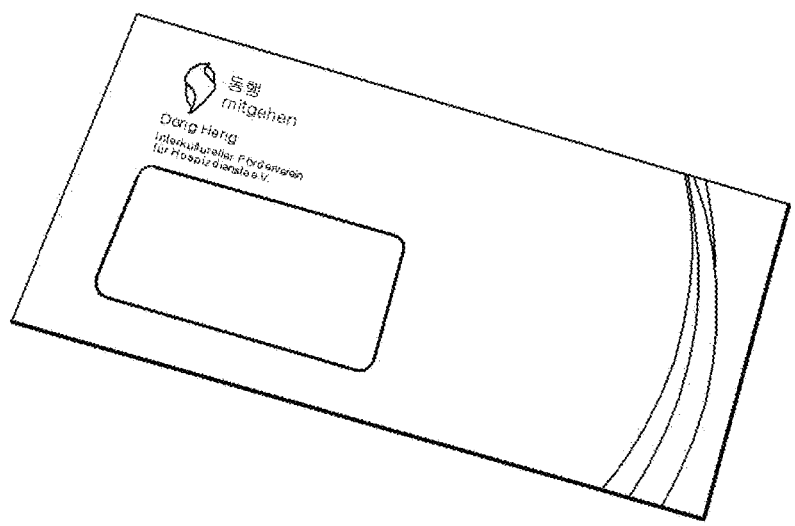
FIG. 2 is an illustrative view of a mail envelope according to one embodiment.

Thereafter, as shown in FIG. 2, the polyester film thus cut is attached to a window in a mail envelope, to thereby provide a mail envelope according to the embodiments.

Hereafter, the present invention is described in more detail by the examples. However, the following examples are just for illustrative purposes, and the present invention will not be limited thereto.

Examples and Comparative Examples

A polyethylene terephthalate (PET) resin (available from SKC Co., Ltd.) was melt extruded through an extruder at a temperature of 280° C., and the extruded sheet was cooled through a pair of casting rolls at a temperature of 20° C. to produce an unstretched sheet. This unstretched sheet was immediately preheated at a temperature of 60° C. and stretched in the MD and in the TD at the stretch ratios shown in Table 1 below at a temperature of 110° C. Thereafter, the stretched sheet was subjected to heat setting for 30 seconds at temperatures shown in Table 1. A PET film was thereby obtained.

TABLE 1

| Classification | Stretch ratio MD | Stretch ratio TD | Heat setting temperature (° C.) | Thickness (μm) | Thickness deviation (%) |
|---|---|---|---|---|---|
| Example 1 | 2.5 | 4.2 | 240 | 19 | 5.0 |
| Example 2 | 2.7 | 4.2 | 245 | 19 | 4.3 |

TABLE 1-continued

| Classification | Stretch ratio MD | Stretch ratio TD | Heat setting temperature (° C.) | Thickness (μm) | Thickness deviation (%) |
|---|---|---|---|---|---|
| Example 3 | 3.0 | 4.2 | 250 | 19 | 3.5 |
| Comparative Example 1 | 1.0 | 4.2 | 80 | 19 | 17 |
| Comparative Example 2 | 3.0 | 4.2 | 80 | 19 | 3.7 |

Results

As shown in Table 1 above and Table 2 below, the polyester films prepared according to the present embodiments show improved cutting performance and stable process performance (e.g., in terms of thickness deviation).

TABLE 2

| Classification | MD Tensile strength (kpsi) | TD Tensile strength (kpsi) | MD Tear strength (kgf/μm) | TD Tear strength (kgf/μm) | Light transmittance | Haze | Cutting performance | A |
|---|---|---|---|---|---|---|---|---|
| Example 1 | 11 | 30 | 25 | 3.0 | 89.2 | 2.7 | o | 1.73 |
| Example 2 | 15 | 27 | 21 | 5.6 | 88.7 | 2.8 | o | 0.8 |
| Example 3 | 14 | 25 | 30 | 9.6 | 89.5 | 2.6 | o | 0.79 |
| Comparative Example 1 | 12 | 21 | 27 | 3.8 | 87.9 | 4.7 | o | 0.75 |
| Comparative Example 2 | 27 | 22 | 34 | 24 | 89.1 | 2.7 | x | 0.19 |

Measurement (1) Tensile Strength

Tensile strength was measured according to ASTM D882.

(2) Tear Strength

Tear strength was measured according to ASTM D1922.

(3) Light Transmittance

Light transmittance was measured according to ASTM D1003.

(4) Haze

Haze was measured according to ASTM D1003.

(5) Cutting Performance

A PET film in a size of 10 cm×10 cm was placed on a steel plate, and a steel blade having a thickness of about 0.5 mm was pressurized perpendicularly onto the film under a pressure of about 600 gf/cm$^2$.

Upon cutting of about 100 sheets of each PET film, the number of instances where the PET film was not clearly cut was counted.

o: Three or less x: Four or more

What is claimed is:

1. A polyester film, which has a thickness of 5-50 μm, a tensile strength of 5-20 kpsi in the longitudinal direction (MD), a tensile strength of 15-40 kpsi in the transverse direction (TD) substantially perpendicular to the MD, and a light transmittance of 80% or more, wherein the polyester film has been stretched about 2-3.5 times in the MD and about 2.5-4.5 times in the TD, and wherein A calculated by Equation 1 is greater than 0.5 and less than 6:

$$\frac{|TS1 - TS2|}{TS1} = A \qquad \text{Equation 1}$$

wherein TS1 and TS2 are tensile strengths in the MD and in the TD, respectively;

wherein the polyester film has a tear strength of 5-85 kgf/μm in the MD and a tear strength of 0-15 kgf/μm in the TD; and wherein the polyester film consists of polyethylene terephthalate.

2. The polyester film of claim 1, wherein the polyester film has a haze of 2.0-30.

3. The polyester film of claim 1, wherein the polyester film has a tensile strength of about 8-20 kpsi in the MD.

4. The polyester film of claim 1, wherein A is greater than 0.6 and less than 3.

5. The polyester film of claim 1, wherein A is greater than 0.7 and less than 3.

6. The polyester film of claim 1, wherein A is greater than 0.7 and less than 2.

7. A mail envelope comprising:

a paper envelope with a window; and a polyester film covering the window, the polyester film having a thickness of 5-50 μm, a tensile strength of 5-20 kpsi in the MD, a tensile strength of 15-40 kpsi in the TD substantially perpendicular to the MD, and a light transmittance of 80% or more, wherein the polyester film has been stretched about 2-3.5 times in the MD and about 2.5-4.5 times in the TD, and wherein A calculated by Equation 1 is greater than 0.5 and less than 6:

$$\frac{|TS1 - TS2|}{TS1} = A \qquad \text{Equation 1}$$

wherein TS1 and TS2 are tensile strengths in the MD and in the TD, respectively;

wherein the polyester film has a tear strength of 5-85 kgf/μm in the MD and a tear strength of 0-15 kgf/μm in the TD; and wherein the polyester film consists of polyethylene terephthalate.

* * * * *